United States Patent [19]
Huang

[11] Patent Number: 5,819,377
[45] Date of Patent: Oct. 13, 1998

[54] STRAPPING DEVICE

[76] Inventor: Han-Ching Huang, No. 12, Alley 111, Lane 437, Chen Hsing Road, Taichung, Taiwan

[21] Appl. No.: 901,758

[22] Filed: Jul. 28, 1997

[51] Int. Cl.$^6$ ..................................................... B25B 25/00
[52] U.S. Cl. ......................................... 24/68 CD; 24/909
[58] Field of Search .............................. 24/68 R, 68 CD, 24/909, 68 B, 68 D

[56] References Cited

U.S. PATENT DOCUMENTS

| | | | |
|---|---|---|---|
| 4,570,305 | 2/1986 | Smetz et al. | 24/68 CD |
| 5,205,020 | 4/1993 | Kamper | 24/68 CD |

*Primary Examiner*—James R. Brittain
*Attorney, Agent, or Firm*—Charles E. Baxley, Esq.

[57] ABSTRACT

A strapping device includes two plates and two arms pivotally connected to the two plates by a shaft to which one end of the strap and two ratchets are securely mounted. Each of the arms has a cam device formed thereto and each of the plates has a stop extending therefrom. A short plate is slidably disposed between the two plates and an operating member is slidably disposed between the two arms, both of which are disengagably engaged with the ratchets. A middle member is slidably and biasedly received between the two plates and is slidably connected to a connecting plate between the two plates. Two extending plates are slidably disposed to the two plates and has a rod connected therebetween which is securely connected to the other end of the strap. The rod and the strap move a short distance with the extending plates relative to the plates when rotating the arms to let the cam devices disengage the middle member from the connecting plate and, simultaneously, pulling operating member to let the pawls be disengaged from the ratchets and stopped by the stop. The strap is completely released when the operating member is moved over the stop and the short plate is disengaged from the ratchets by the cam devices.

5 Claims, 6 Drawing Sheets

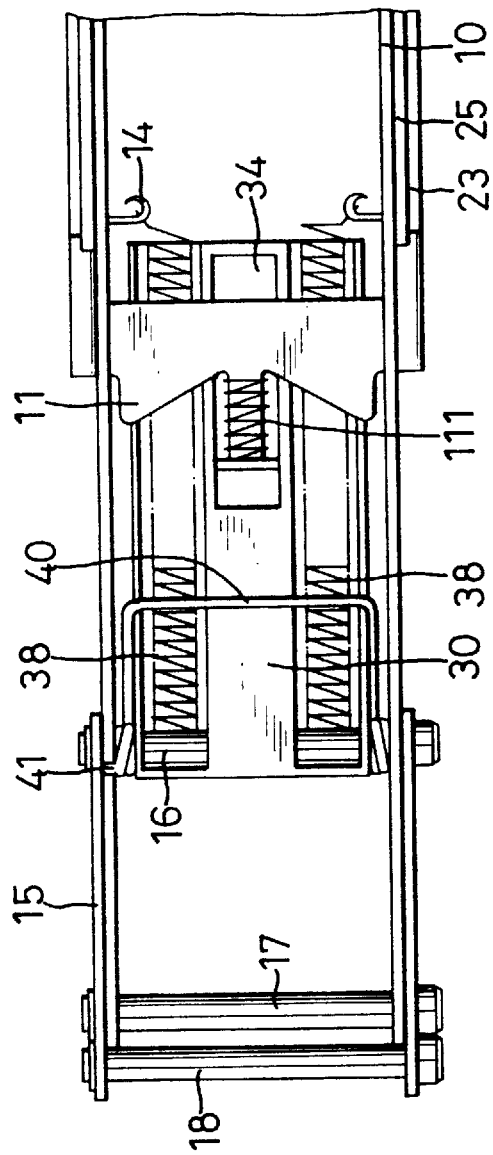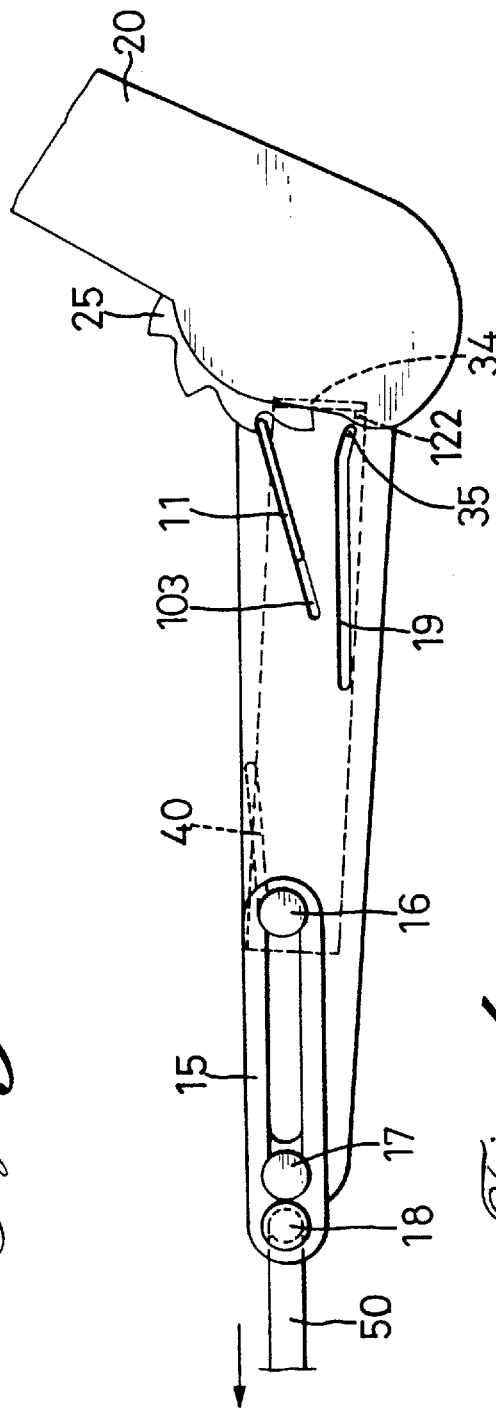

5,819,377

STRAPPING DEVICE

BACKGROUND OF THE INVENTION

1. Field of the Invention

The present invention relates to a strapping device and, more particularly, to an improved strapping device having a safety means so that a user may check whether the strapped piles of goods are stable or not if the straps are suddenly loosened by operating the strapping device.

2. Brief Description of the Prior Art

Generally, goods is received in boxes which are piled up on a truck for transportation. In order to keep the piles of boxes in a stable status, straps are usually used to strap the boxes tightly by operating a strapping device which is disclosed in U.S. Pat. No. 5,560,086 to Han-ching HUANG, issued on Oct. 1, 1996. When the boxes are to be removed from the truck, a user has to loosen the straps by reversely operating the strapping device. If the piles of the boxes are not stable because vibration during transportation, for example, then when the straps are suddenly loosened, the boxes could drop and injure the operator and/or other workers.

The present invention intends to provide an improved strapping device to mitigate and/or obviate the above-mentioned problem.

SUMMARY OF THE INVENTION

In accordance with aspect of the present invention, there is provided a strapping device comprising a pair of plates each having a first end and a second end and a connecting plate connected therebetween which has a protrusion extending therefrom. A first slots and a second slot are respectively defined in each of the plates near the first end thereof wherein the second slots each have a downwardly inclined portion. A third slot and a first hole are respectively defined in each of the plates and located near the second end of the plate. At least one of the plates has a stop extending from the first end thereof which has a recess defined therein.

A handle has two arms respectively and pivotally disposed to the first ends of the two plates by a shaft extending therethrough wherein two ratchets are respectively and securely mounted to the shaft and located between the plates and the arms. Each one of the two arms has a cam means formed to a distal end thereof which is pivotally connected to the plate corresponding thereto.

An operating member is slidably and biasedly disposed between the two arms and has two pawls respectively engaged with the ratchets. A short plate is biasedly and slidably received in the first slots with two ends thereof extending through the two first slots so that the two ends of the short plate are respectively engaged with the two ratchets.

A middle member is slidably received between the two plates and has a pin extending through a first end of the middle member and the two second slots. The middle member has a passage defined transversely through a second end thereof. A hook extends downwardly from the first end of the middle member and is disengagably engaged with the protrusion. At least one spring is connected between the second end of the middle member and the first end of one of the plates.

Two extending plates are respectively disposed to outside of the two plates and each of the extending plates has a fourth slot and a second hole defined therethrough. A first rod extends through the fourth slots, the third slots and the passage. A second rod extends through the fourth slots and the first holes. A third rod is fixedly connected between the two extending plates and extends through the two second holes.

The pawls are able to be disengaged form the ratchets by pulling the operating member and stopped by the stop, the hooks of the middle member being disengaged from the protrusion by the cam means when rotating the two arms such that the strap and the two extending plates move a distance within the third slots of the plates so that an operator can check whether the strapped goods is stable or not.

It is an object of the present invention to provide a strapping device which releases a strap by two controlled steps so as to assure a safety operation.

It is an object of the present invention to provide a strapping device which allows the strap to move a short distance before it is completely released.

Other objects, advantages, and novel features of the invention will become more apparent from the following detailed description when taken in conjunction with the accompanying drawings.

BRIEF DESCRIPTION OF THE DRAWINGS

FIG. 3 is a top plan view to show the strapping device;

FIG. 4 is an illustrative side view of the strapping device shown in FIG. 3;

DETAILED DESCRIPTION OF THE PREFERRED EMBODIMENT

Figure 1:
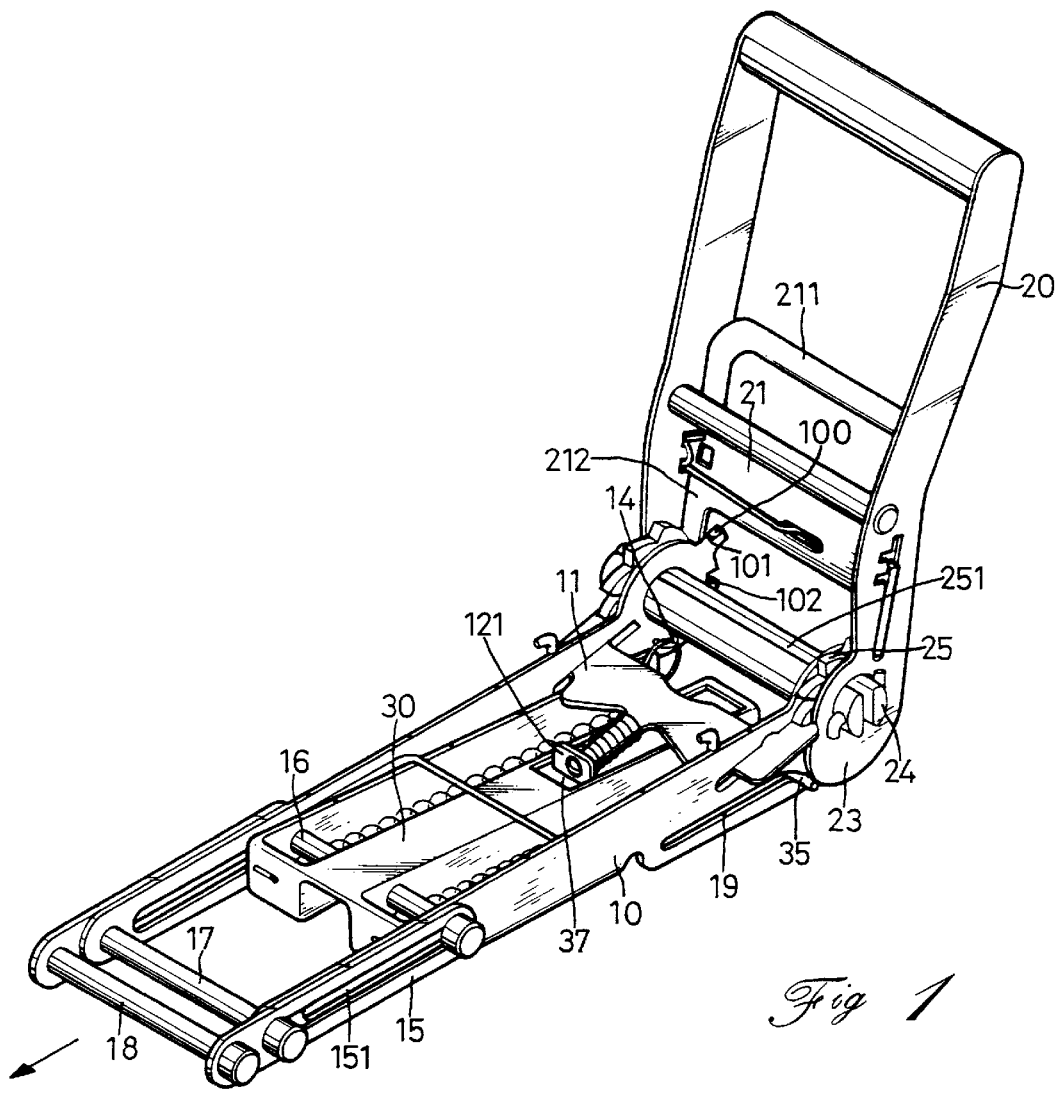
FIG. 1 is a perspective view of a strapping device in accordance with the present invention.
Figure 2:
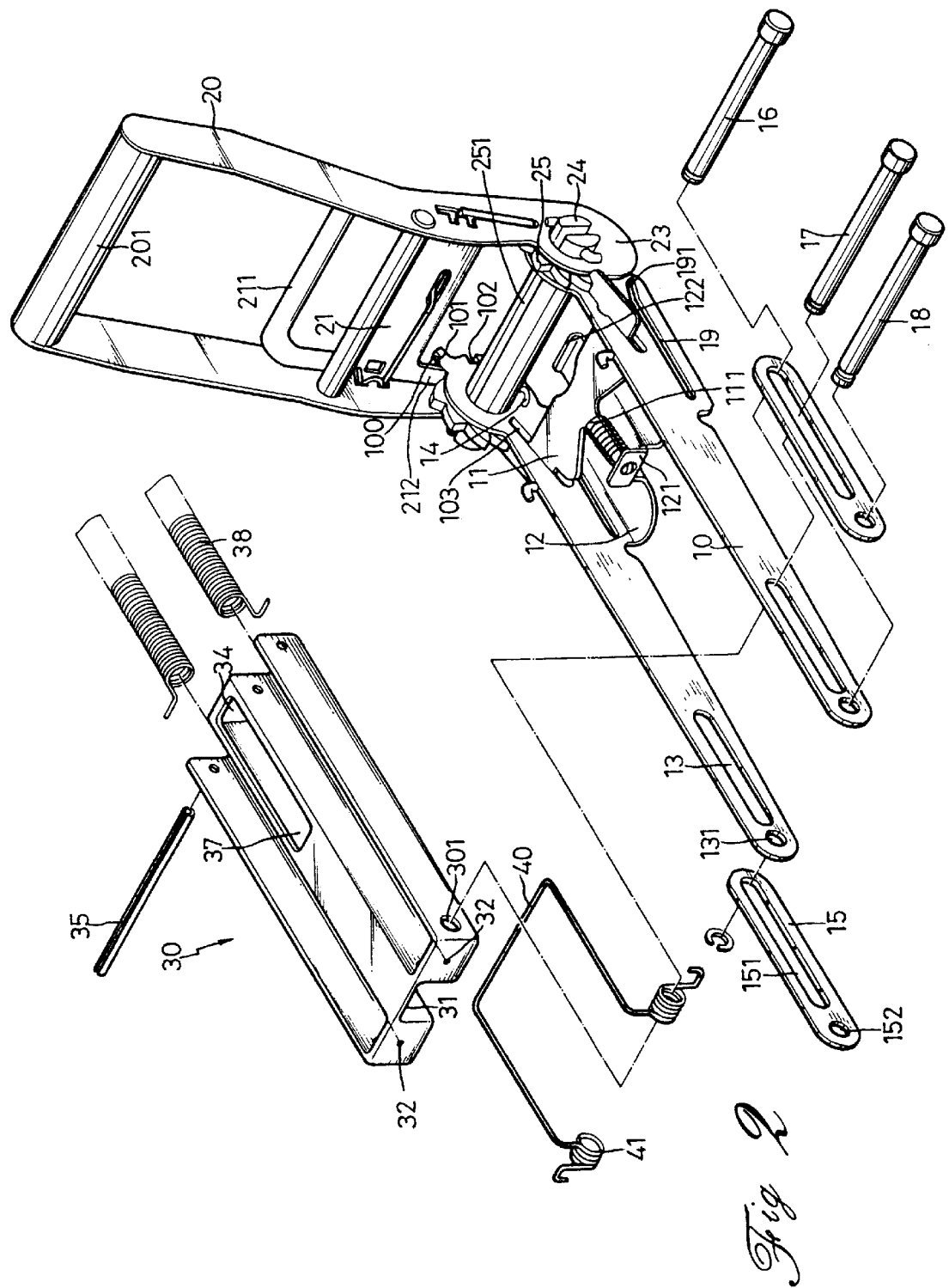
FIG. 2 is an exploded view of the strapping device in accordance with the present invention.

Referring to the drawings and initially to FIGS. 1 through 4, a strapping device in accordance with the present invention generally includes a pair of plates 10 each having a first end and a second end and a connecting plate 12 connected between the two plates 10 wherein the connecting plate 12 has a protrusion 122 extending upwardly from a first end thereof and an end plate 121 extending upwardly from a second end thereof. A first slots 103 and a second slot 19 are respectively defined in each of the plates 10 near the first end thereof wherein the second slots 19 each have a downwardly inclined portion 191 and are located below the first slots 103. A third slot 13 and a first hole 131 are respectively defined in each of the plates 10 and located near the second end of the plate 10. Each of the plates 10 has a stop 100 extending from the first end thereof and a recess 102 defined in the first end thereof. The stops 100 each have a notch 101 defined therein.

A handle has two arms 20 and a transverse bar 201 connected between the two arms 20 which are respectively and pivotally disposed to the first ends of the two plates 10 by a shaft 24 extending therethrough wherein two ratchets 25 are respectively and securely mounted to the shaft 24 and located between the plates 10 and the arms 20. The shaft 25 has a slit 251 defined longitudinally therethrough so as to securely receive a first end of a strap 50 (only a second end of the strap is shown in FIG. 4). The two arms 20 each have a cam means 23 formed to a distal end thereof which is pivotally connected to the corresponding plate 10.

An operating member 21 is slidably and biasedly disposed between the two arms 20 and has two pawls 212 extending from a lower portion thereof so as to be respectively engaged with the ratchets 25.

A short plate 11 is biasedly and slidably received in the first slots 103 between the two plates 10 with two ends of the short plate 11 extending through the two first slots 103. The two ends of the short plate are respectively engaged with the two ratchets 25. The short plate 11 has a tail extending therefrom and is fixedly connected to the end plate 121. A spring 111 is biasedly mounted to the tail so that the two ends of the short plate 11 are biased to engage with the ratchets 25.

A middle member 30 is slidably received between the two plates 10 and has a groove 31 defined in a bottom thereof, an elongate slot 37 defined in a top of the middle member 30 and communicating with the groove 31 so that the end plate 121 is received in the elongate slot 37. A pin 35 extends through a first end of the middle member 30 and the two second slots 19. The middle member 30 has a passage 301 defined transversely through a second end thereof and a hook 34 extends downwardly from the first end of the middle member 30 so as to be disengagably engaged with the protrusion 122. Two springs 38 each have one end thereof securely hooked into two holes 32 defined in the second end of the middle member 30 and the other ends of the springs 38 hooked to rings 14 respectively disposed to an inner side of each of the first ends of the plates 10.

Two extending plates 15 are respectively disposed to outside of the two plates 10 and each of the extending plates 15 has a fourth slot 151 and a second hole 152 defined therethrough. A first rod 16 extends through the fourth slots 151 of the two extending plates 15, the third slots 13 of the plates 10, two ends 41 of a U-shaped torsion spring 40 and the passage 301 of the middle member 30 wherein the two ends 41 of the torsion spring 40 is securely mounted to the first rod 16 so that the middle member 30 is pressed by the torsion spring 40 so that the pin 35 is positioned in the downwardly inclined portions 191.

A second rod 17 extends through the fourth slots 151 of the two extending plates 15 and the first holes 131 of the two plates 10. The second end of the strap 50 is fixedly connected to a third rod 18 which is fixedly connected between the two extending plates 15 and extends through the two second holes 152.

Figure 5:
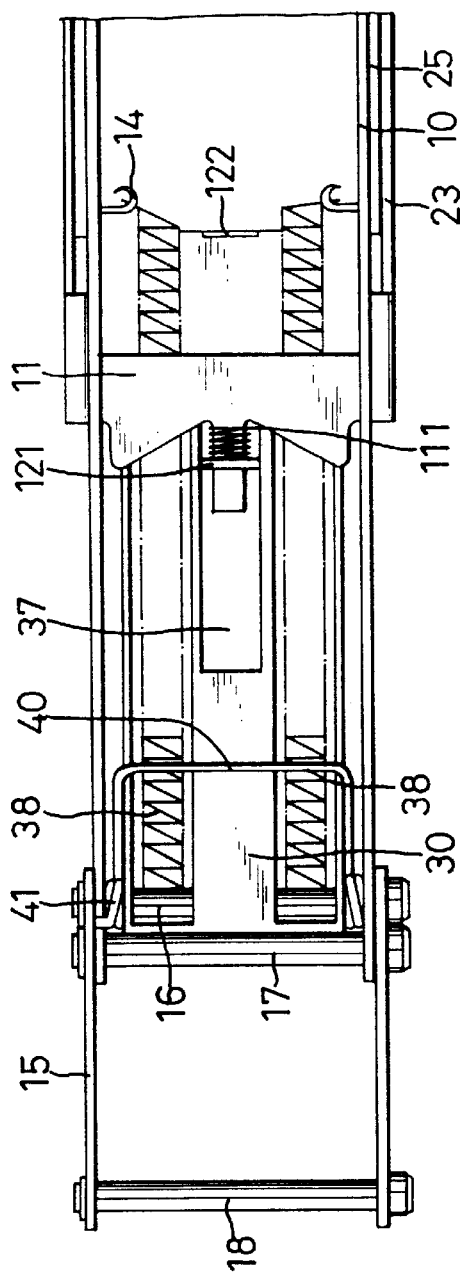
FIG. 5 is a top plan view to show when a middle member received between two plates of the strapping device moves a short distance.
Figure 6:
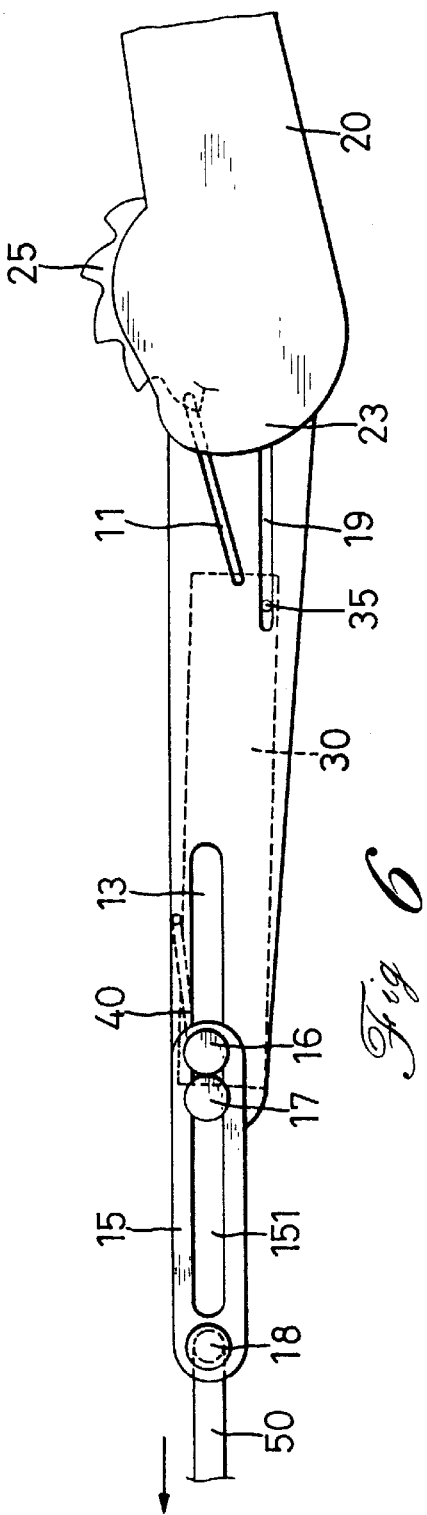
FIG. 6 is an illustrative side view of the strapping device shown in FIG. 5.
Figure 7:
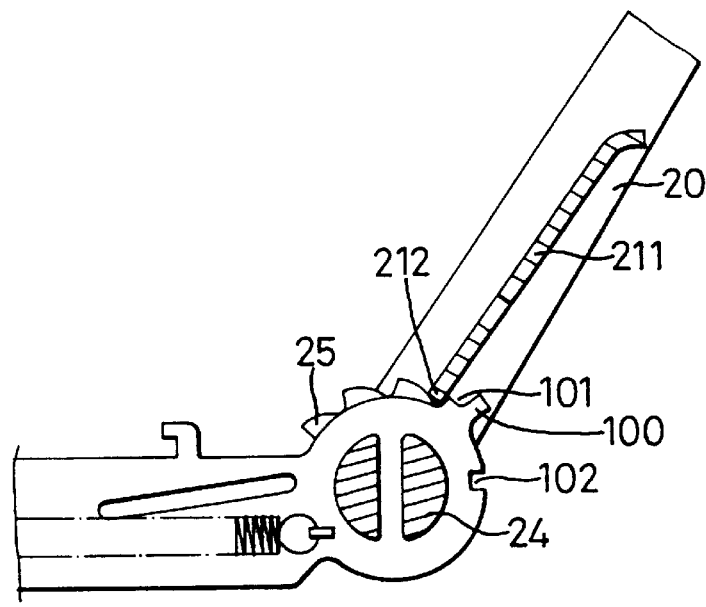
FIG. 7 is an illustrative side view, partly in section, of the strapping device when an operating member is pulled to disengage from the ratchets.
Figure 8:
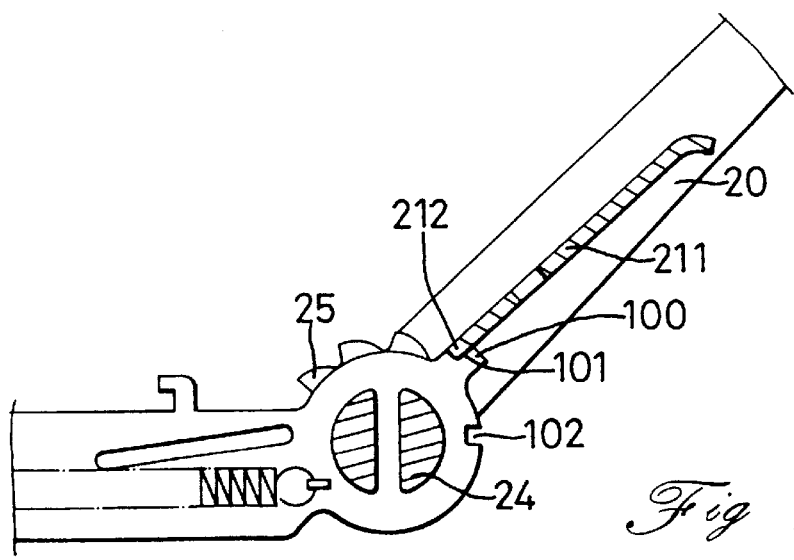
FIG. 8 is an illustrative side view, partly in section, of the strapping device when an operating member is further pulled and rotated to engage with a notch of a stop.

Goods (not shown) is strapped around by the strap 50 by rotating the arms 20, the ratchets 25 and the shaft 24 (the procedures of operation are the same as the conventional strapping mechanism such as the U.S. Pat. No. 5,560,086 mentioned above) to securely strap the goods between the two ends of the strap 50. When releasing the strap 50, an operator (not shown) pulls a handle 211 of the operating member 21 and rotates the two arms 20 clockwise to let the two pawls 212 be disengaged from the ratchets 25 as shown in FIG. 7. When the two arms 20 are continued to be rotated and the operating member 21 is pulled slightly, the two pawls 212 are engaged with the notches 101 and stopped by the stops 100 as shown in FIG. 8. Simultaneously, when the two arms 20 are rotated as shown in FIG. 8, the cam means 23 of the two arms 20 push the pin 35 upwardly so that the first end of the middle member 30 is lifted and the hook 34 is disengaged from the protrusion 122. Because there has a large tension force to pull the strap 50 so that the second end of the strap 50 which is fixedly connected to the third rod 18 is then pulled to draw the middle member 30 a distance the same as a length of the third slots 13 as shown in FIGS. 5 and 6. Because the two ends of the short plate 11 are still engaged with the ratchets 25 so that the strap 50 is not yet loosened completely. The user now can check whether the goods strapped by the strap 50 is piled stably or not because the strap 50 is released only a short distance so that even if the goods is not stable, the tension of the strap 50 still works and will not release the goods completely and suddenly so as to prevent the goods from dropping.

Figure 9:
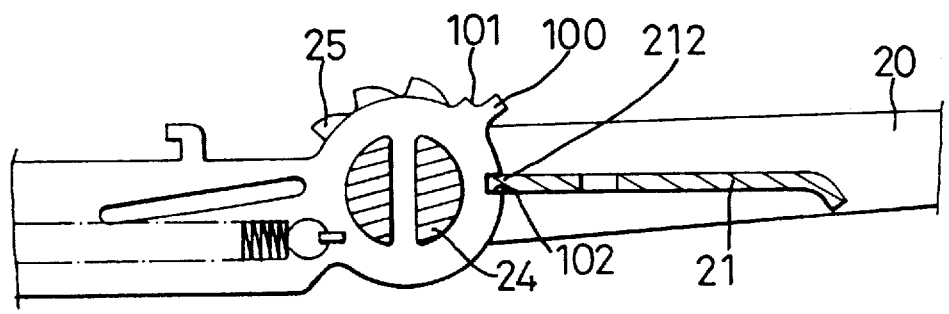
FIG. 9 is an illustrative side view, partly in section, of the strapping device when an operating member is pulled over the stop and rotated engage so as to be received in a recess defined in each of the plates.

Referring to FIG. 9, if the user decides to release the strap 50 completely, then he/she further pulls the operating member 21 over the stops 100 and rotates the two arms 20 till the two pawls 212 are received in the recesses 102 of the plates 10. Simultaneously, the two ends of the short plate 11 are pushed and disengaged from the ratchets 25 by the cam means 23. Once the tension of the strap 50 is disappeared, the middle member 30 is pulled to its original position by the springs 38.

Accordingly, the strapping device allows the strap 50 to be released in two steps so that the user can check the goods and thus a sudden dropping of goods can be effectively avoided.

Although the invention has been explained in relation to its preferred embodiment, it is to be understood that many other possible modifications and variations can be made without departing from the spirit and scope of the invention as hereinafter claimed.

What is claimed is:

1. A strapping device comprising:

a first plate and a second plate each having a first end and a second end and a connecting member connected between said first and second plates wherein said connecting member has a protrusion extending therefrom, a first slot and a second slot respectively defined in each of said first and second plates near said first end thereof wherein said second slots each have a downwardly inclined portion, a third slot and a first hole respectively defined in each of said first and second plates and located near said second end of said first and second plates, at least one of said first and second plates having a stop extending from said first end thereof which has a recess defined therein;

a handle having two arms which are respectively and pivotally disposed to said first ends of said first and second plates by a shaft extending therethrough wherein two ratchets are respectively and securely mounted to said shaft and located between said first and second plates and said arms, a cam means formed to a distal end of each one of said two arms wherein said distal end is pivotally connected to said first and second plate corresponding thereto;

an operating member slidably and biasedly disposed between said two arms and having two pawls extending from a lower portion thereof so as to be respectively engaged with said ratchets;

a short third plate biasedly and slidably received in said first slots with two ends thereof extending through said two first slots, said two ends of said short third plate respectively engaged with said two ratchets;

a middle member slidably received between said first and second plates and having a pin extending through a first end of said middle member and said two second slots, said middle member having a passage defined transversely through a second end thereof, a hook extending downwardly from said first end of said middle member and disengageably engaged with said protrusion, at least one spring connected between said second end of said middle member and said first end of one of said first and second plates;

two extending fourth and fifth plates respectively disposed to outside of said first and second plates and each of said extending fourth and fifty plates having a fourth slot and a second hole defined therethrough, a first rod extending through said fourth slots of said two extending fourth and fifth plates, said third slots of said first and second plates and said passage of said middle member;

a second rod extending through said fourth slots of said two extending fourth and fifth plates and said first holes of said first and second plates, and a third rod fixedly connected between said two extending fourth and fifth plates and extending through said two second holes.

2. The strapping device as claimed in claim 1, wherein a U-shaped torsion spring is disposed between said first and second plates and presses said middle member, said torsion spring having two ends securely mounted to said first rod.

3. The strapping device as claimed in claim 1, wherein said connecting member has an end plate extending upwardly therefrom to which said short third plate is fixedly connected which has a second spring mounted thereto.

4. The strapping device as claimed in claim 3, wherein said middle member has an elongate slot defined therethrough so that said end plate of said connecting member is received within said elongate slot.

5. The strapping device as claimed in claim 1 wherein said stop has a notch defined therein so as to receive said pawl corresponding thereto.

\* \* \* \* \*